(12) United States Patent
Fisher et al.

(10) Patent No.: US 9,116,296 B2
(45) Date of Patent: Aug. 25, 2015

(54) OPTICAL FIBER DEVICE HAVING MODE STRIPPER THERMALLY PROTECTING STRUCTURAL ADHESIVE

(71) Applicant: Gooch and Housego PLC, Ilminster, Somerset (GB)

(72) Inventors: Norman Edward Fisher, Torquay (GB); Adrian Mark Norman, Plymouth (GB)

(73) Assignee: Gooch and Housego PLC, Somerset (GB)

( * ) Notice: Subject to any disclaimer, the term of this patent is extended or adjusted under 35 U.S.C. 154(b) by 184 days.

(21) Appl. No.: 13/965,443

(22) Filed: Aug. 13, 2013

(65) Prior Publication Data
US 2015/0049983 A1    Feb. 19, 2015

(51) Int. Cl.
G02B 6/14    (2006.01)
B32B 37/12    (2006.01)

(52) U.S. Cl.
CPC .. *G02B 6/14* (2013.01); *B32B 37/12* (2013.01)

(58) Field of Classification Search
CPC ......... G02B 6/14; B08B 3/00; H04B 10/2581
USPC .......................................................... 385/29
See application file for complete search history.

(56) References Cited

U.S. PATENT DOCUMENTS

| | | | |
|---|---|---|---|
| 3,944,328 A * | 3/1976 | Kent et al. | ......................... 385/70 |
| 4,783,137 A | 11/1988 | Kosman et al. | |
| 5,479,548 A * | 12/1995 | Cote et al. | ......................... 385/51 |
| 6,865,316 B1 * | 3/2005 | Pratt | ................................ 385/29 |
| 8,317,413 B2 | 11/2012 | Fisher et al. | |
| 8,542,971 B2 * | 9/2013 | Chatigny | ........................ 385/134 |
| 2003/0103753 A1 * | 6/2003 | Cabot et al. | ..................... 385/135 |
| 2006/0062532 A1 * | 3/2006 | Reith et al. | ...................... 385/123 |
| 2007/0172174 A1 | 7/2007 | Seerbak et al. | |
| 2007/0206909 A1 * | 9/2007 | Wetter et al. | ...................... 385/92 |
| 2011/0249935 A1 * | 10/2011 | Hu | ..................................... 385/27 |
| 2013/0016740 A1 | 1/2013 | Saracco | |

FOREIGN PATENT DOCUMENTS

| | | |
|---|---|---|
| WO | 2007082387 | 7/2007 |
| WO | 2012167102 | 12/2012 |

OTHER PUBLICATIONS

Alexandre Wetter, et al., "High Power Cladding Light Strippers", Fiber Lasers V: Technology, Systems and Applications, Proc. of SPIE vol. 6873, 687327-1 (2008).

\* cited by examiner

*Primary Examiner* — Akm Enayet Ullah
(74) *Attorney, Agent, or Firm* — Jetter & Associates, P.A.

(57) ABSTRACT

An optical fiber device includes a first optical element for transmitting light. An output fiber includes an output fiber core having a light receiving end optically aligned to receive light from the first optical element, and includes at least a first outer cladding on a clad portion. The output fiber includes a mode stripper adhesive with a first adhesive composition and a structural adhesive with a second adhesive composition thereon. The mode stripper adhesive is positioned closer to the first optical element than the structural adhesive to strip a majority of power of cladding guided mode(s) light before reaching the structural adhesive. The mode stripper adhesive has a lower hardness as compared to the structural adhesive, and is substantially indexed matched to an outermost layer of the output fiber that it is in direct contact with.

9 Claims, 5 Drawing Sheets

Method (100)

```
AN OPTICAL FIBER DEVICE IS PROVIDED INCLUDING AN OUTPUT FIBER
INCLUDING AN OUTPUT FIBER CORE HAVING A LIGHT RECEIVING END
RECEIVING LIGHT FROM A FIRST OPTICAL ELEMENT, AND AT LEAST A
FIRST OUTER CLADDING ON A CLAD PORTION OF THE OUTPUT FIBER
CORE. AN ADHESIVE CONTAINING PORTION OF THE OUTPUT FIBER
INCLUDES A MODE STRIPPER ADHESIVE COMPRISING A FIRST
ADHESIVE COMPOSITION THEREON AND A STRUCTURAL ADHESIVE
COMPRISING A SECOND ADHESIVE COMPOSITION FOR SECURING        — 101
THE OUTPUT FIBER TO A SUBSTRATE OR A HOUSING. THE MODE
STRIPPER ADHESIVE HAS A LOWER HARDNESS AS COMPARED TO THE
HARDNESS OF THE STRUCTURAL ADHESIVE, AND IS SUBSTANTIALLY
INDEXED MATCHED TO AN OUTERMOST LAYER OF THE OUTPUT FIBER
THAT IT IS IN DIRECT PHYSICAL CONTACT WITH. A LEADING EDGE OF
THE MODE STRIPPER ADHESIVE IS POSITIONED CLOSER TO THE FIRST
OPTICAL ELEMENT THAN THE STRUCTURAL ADHESIVE.
```

RECEIVING LIGHT FROM THE FIRST OPTICAL ELEMENT — 102

THE MODE STRIPPER ADHESIVE STRIPPING AT LEAST A MAJORITY
(>50%) OF POWER OF CLADDING GUIDED MODE(S) OF THE LIGHT — 103
TO THE SUBSTRATE OR HOUSING BEFORE REACHING THE
STRUCTURAL ADHESIVE

*FIG. 1*

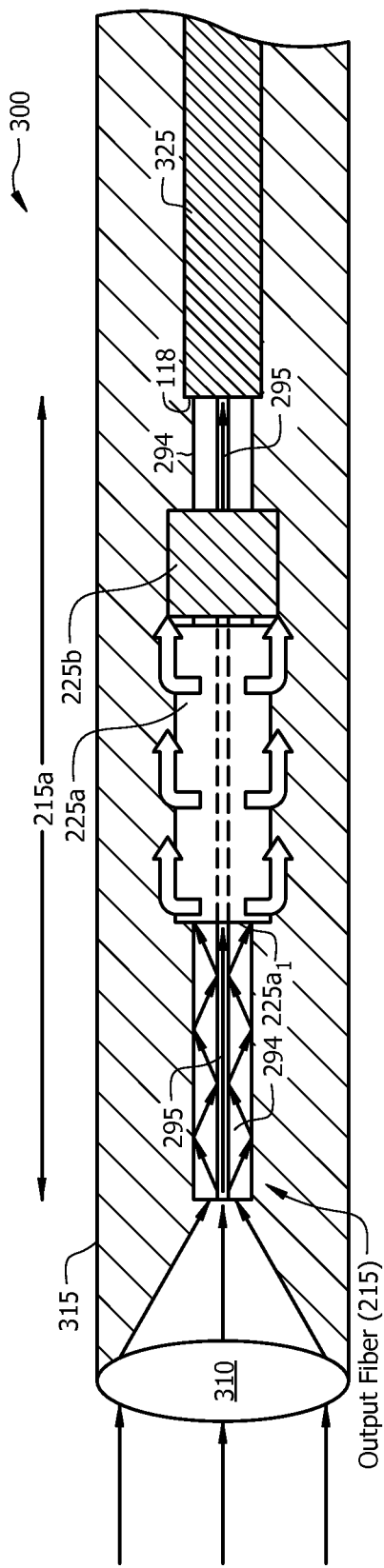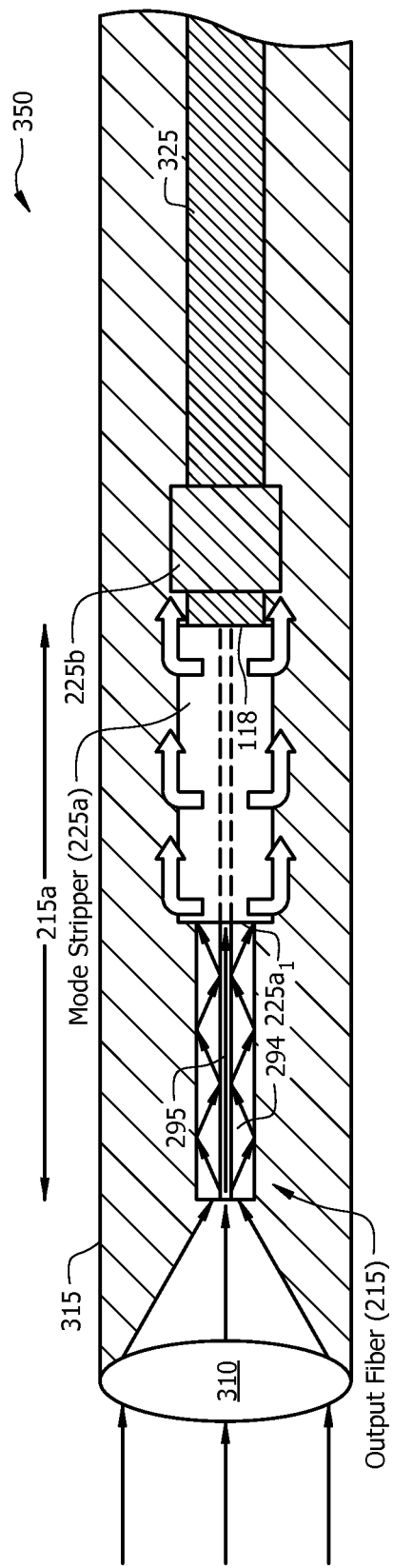
FIG. 3A
FIG. 3B

OPTICAL FIBER DEVICE HAVING MODE STRIPPER THERMALLY PROTECTING STRUCTURAL ADHESIVE

FIELD

Disclosed embodiments relate to packaged optical fiber devices and more specifically packaged optical fiber devices having cladding mode stripper.

BACKGROUND

There is an increasing demand for packaged optical fiber devices such as fused-fiber devices whose packaging is more efficient at conducting internally generated heat to the external heat sink, and thus are reliably able to transmit higher optical powers. Both power handling and reliability are generally significantly affected by the packaging of the device. Packaged fused-fiber devices are commonly produced with housings of circular or rectangular profile. Inside the housing is generally a thermally conductive substrate upon which a suitable adhesive (or affixment) material is applied on or proximate to the fused portion on both sides of the fused portion/splice to secure this fiber section to the housing. It is generally within this affixment material that optical loss from the fiber first appears as heat. The substrate conventionally has a D-shaped or slab-shaped geometry, and may have a slotted region in which to locate the fused portion of the device.

During operation of a fused-fiber device, the splice will produce core loss due to optical scattering resulting in some of the light in the fiber core launched (leaking into) into the surrounding cladding which may then be stripped by the affixment material. At high powers this may lead to significant heating of the affixment material. Hence, it may be advantageous to strip this light before it reaches the affixment material. Conventional stripping in a "cladding mode stripper device" for instance (typically a housed double clad fiber (DCF) with its low index polymer (LIP) coating removed) use an adhesive(s) applied onto the cladding of the fiber to strip essentially all pump light cladding modes without perturbing the amplified signal light propagating in the single mode core. As a result, amplified output light from a laser system has an improved $M^2$ because the unwanted multimode light is removed by the adhesive (e.g., an epoxy glue) to the substrate within the package.

In the case of tapered fused bundle (TFB) device the splice between the fused bundle and its output fiber (which can have a glass cladding or a LIP coating thereon) gives rise to high order cladding modes not captured by the core of the output fiber. For the case of a glass clad fused fiber device, in contrast to a LIP fused fiber device, fiber stripping around the splice removes the outer higher index (e.g. acrylate) buffer layer leaving only the glass cladding (e.g., doped silica) on the output fiber proximate to the splice. The adhesive (e.g., a polymer glue) for the glass clad fused fiber device in contrast to the LIP fused fiber device can be placed in direct physical contact with the stripped fiber of the output fiber as this arrangement will not result in a loss of guided mode light within the fiber core because the guided fiber core region is protected from light loss by the glass cladding thereon.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize in some optical systems pump light power can reach a kW or more, and too hot a region proximate to the affixment adhesive referred to herein as a "structural adhesive" that secures a fiber section to a substrate can degrade it while the device is operating in the package. Thus, one limiting factor in high power package capability recognized herein for known fused-fiber devices is heating of the structural adhesive by the high order cladding modes not captured by the output fiber's core that become stripped by the structural adhesive holding the fiber section to the substrate.

Disclosed embodiments solve this problem by providing optical fiber devices having multiple adhesive compositions including a mode stripper adhesive comprising a first adhesive composition that provides mode stripping of cladding modes having a leading edge positioned closer to a first optical element that transmits light received from a light source (e.g., a laser) than a structural adhesive comprising a second adhesive composition. As used herein a "structural adhesive" is defined as a cured adhesive material having at least one of (i) a 25° C. tensile (or lapshear) and/or die shear strength that exceeds 1,000 psi and (ii) a Shore hardness on the Durometer Shore D scale. Shore hardness is a known hardness measurement scale with increasing hardness alphabetically, with the Durometer Shore A scale representing the softest cured materials (or "rubbery" materials), and the Durometer Shore D scale being for harder "plastic" cured materials. Common structural adhesives are Durometer Shore D materials which can comprise synthetic polymers such as epoxy, polyurethane, acrylate, and cyanoacrylate.

The mode stripper adhesive thus first receives the light and strips at least a majority (>50%) of power of cladding guided mode(s) of the light before the cladding mode light reaches the structural adhesive. Disclosed optical fiber devices include fused fiber devices including tapered fused bundles (TFBs) whether standard single clad or double clad fiber (DCF), fused couplers, and collimator-to-fiber arrangements.

Disclosed embodiments recognize unless the refractive index ($n_f$) of the structural adhesive material for the optical fiber device is significantly less than the fiber's outermost buffer coating, the structural adhesive material being in physical contact with the outermost buffer coating will strip a significant percentage of the power from the cladding mode light propagating in outermost buffer coating, which at high power operation (e.g., >1 kW) can lead to significant heating of the structural adhesive. The degree of heating of the structural adhesive is dependent upon the degree of splice loss in the case of TFBs, the refractive index of the structural adhesive, its transmissive/absorption properties, its thermal conductivity, and how well it is heat sunk to its substrate and housing (the surrounding package). For glass clad fused fiber devices, the cladding is a single glass layer, so that the structural adhesive for mode stripping being in direct physical contact with the glass cladding and having a similar refractive index is also recognized to strip a significant percentage of power of the cladding mode light which at high power operation can lead to significant heating of the structural adhesive.

Excessive heating of any adhesive leads to its degradation, including loss of significant bonding strength, change in $n_f$, out-gassing, discoloration etc., and as a result can be a limiting factor in an optical package's high power handling capability. Excessive heating may also adversely impact an adhesive's performance including product shrinkage upon cure, optical clarity and transmission (if the adhesive is in the light path), viscosity (for processing), thermal expansion and hardness. Moreover, conventional structural adhesive compositions such as epoxies do not exhibit Telecordia standard properties in terms of a structural adhesive, requiring a qualification program should an adhesive more suitable for high power operation be sought.

Disclosed optical fiber devices include a mode stripper adhesive that receives cladding mode light (and thus heat) from an outer higher index coating for an LIP output fiber, from glass cladding for a glass clad output fiber devices, or from the cladding of the output fiber core in embodiments including a collimator-to-fiber arrangement. The leading edge of the mode stripper adhesive is positioned prior to the structural adhesive with respect to the direction of the propagating light in the optical fiber device. The mode stripper adhesive exhibits a temperature handling capability greater than the structural adhesive and is softer than the structural adhesive, so that the structural adhesive remains instrumental in supporting the optical fiber device to the package. In one embodiment the mode stripper adhesive comprises thermally conductive silicone rubber having a thermal conductivity of at least 1 W/m·K at 25° C.

The composition and length for the mode stripper adhesive is selected to strip at least a majority (>50%) of power of cladding guided mode(s) of the light before reaching the structural adhesive. As a result, during device operation the mode stripper adhesive is generally significantly hotter than the structural adhesive, and the structural adhesive thus remains significantly cool(er) during operation than without a disclosed mode stripper adhesive.

BRIEF DESCRIPTION OF THE DRAWINGS

Reference will now be made to the accompanying drawings, which are not necessarily drawn to scale, wherein:

FIG. 1 is a flow chart that shows steps in an example method for cooling an optical fiber device having multiple adhesive compositions including a mode stripper adhesive configured to protect a structural adhesive from heat damage during operation, according to an example embodiment.

FIG. 3A depicts an example collimator-to-fiber device having multiple adhesive compositions including a mode stripper adhesive configured to protect a structural adhesive from heat damage during operation, according to an example embodiment.

FIG. 3B depicts another example collimator-to-fiber device having multiple adhesive compositions including a mode stripper adhesive configured to protect a structural adhesive from heat damage during operation, according to an example embodiment.

DETAILED DESCRIPTION

Figure 2A:
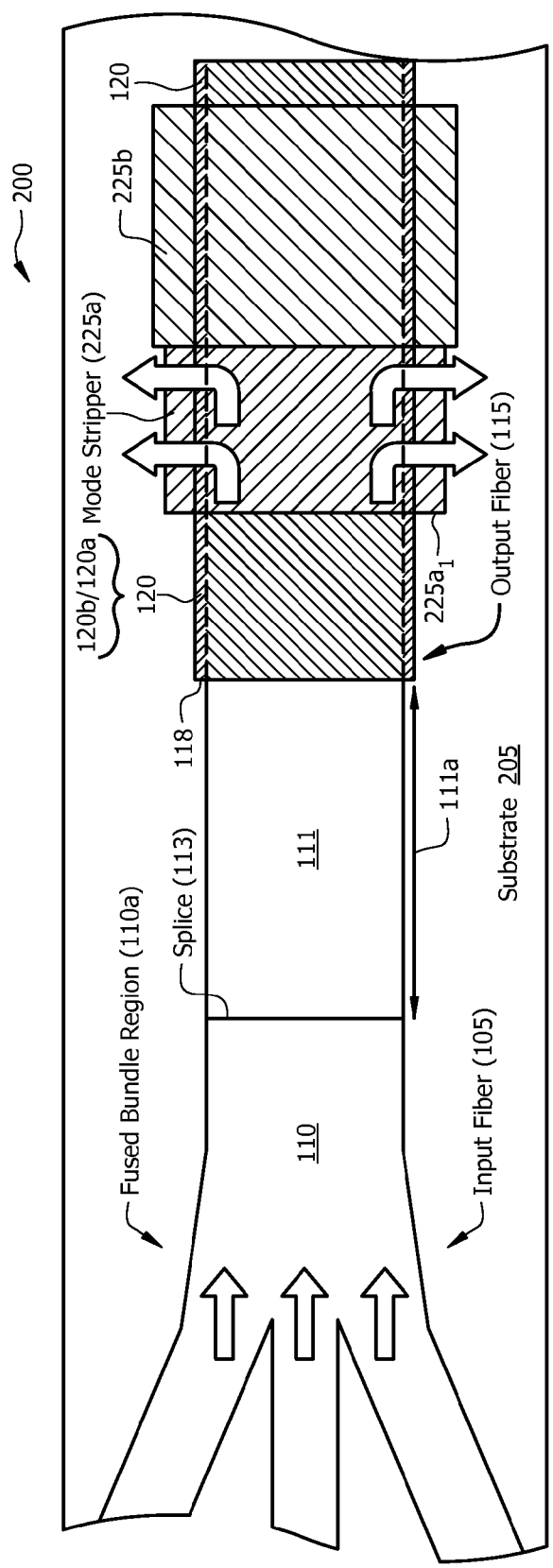
FIG. 2A depicts an example fused fiber device having multiple adhesive compositions including a mode stripper adhesive configured to protect a structural adhesive from heat damage during operation, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this Disclosure.

FIG. 1 is a flow chart that shows steps in an example method 100 for cooling an optical fiber device having multiple adhesive compositions including a mode stripper adhesive configured to protect a structural adhesive from heat damage during operation, according to an example embodiment. Step 101 comprises providing an optical fiber device including at least one output fiber including an output fiber core having a light receiving end receiving light from a first optical element, such as another fiber or a collimator, and at least a first outer cladding on a clad portion of the output fiber core. As noted above, disclosed embodiments are applicable to optical fiber devices including fused fiber devices including tapered fused bundles (TFBs) whether standard single clad or double clad fiber (DCF), fused couplers, and collimator-to-fiber arrangements.

The adhesive containing portion of the output fiber includes a mode stripper adhesive comprising a first adhesive composition thereon and a structural adhesive comprising a second adhesive composition different from the first adhesive composition on an adhesive containing portion of the output fiber for securing the output fiber to a substrate or a housing. The mode stripper adhesive has a lower hardness as compared to the hardness of the structural adhesive. The mode stripper adhesive being softer than the structural adhesive results in the structural adhesive remaining instrumental in supporting the optical fiber device to the package. In one embodiment the mode stripper adhesive comprises thermally conductive silicone rubber having a thermal conductivity of at least 1 W/m·K.

The mode stripper adhesive is substantially indexed matched to an outermost layer of the output fiber that it is in direct physical contact with, and a leading edge of the mode stripper adhesive is positioned closer to the first optical element than the structural adhesive. The mode stripper adhesive being "substantially refractive indexed matched" to the outermost layer of the output fiber refers herein to a maximum $n_f$ range of 0.07, and a maximum range of 0.04 in some embodiments. Step 102 comprises receiving light from the first optical element. Step 103 comprises the mode stripper adhesive stripping at least a majority (>50%) of the power of cladding guided mode(s) of the light to a substrate or housing before reaching the structural adhesive, which protects the structural adhesive from thermal damage.

FIG. 2A depicts an example fused-fiber device 200 having multiple adhesive compositions including a mode stripper adhesive configured to protect a structural adhesive from heat damage during operation, according to an example embodiment. Fused fiber device 200 includes a substrate 205. Substrate 205 can comprise a thermally conductive material, and can be in a variety of shapes including slotted, D or L-shaped. In one particular embodiment, the substrate 205 can comprise fused silica due to its reliability, rigidity and thermal expansion characteristics that match conventional silica optical fiber in typical applications where the fused-fiber device comprises silica.

Fused fiber device 200 includes a first optical element shown as an input fiber 105 having an input fiber core 110 (e.g., silica) fed light by a fused bundle region 110a including a Taper Fused Bundle (TFB) for transmitting light received from a light source (e.g., a laser, not shown). Although fused fiber device 200 is shown in FIG. 2A as being a standard TFB device, the TFB can be a DCF device including an outer cladding, a MM outer core (inner cladding) and a SM core. An output fiber 115 includes an output fiber core 111 having a light receiving end 111*a* optically aligned for the output fiber core 111 to receive light from the input fiber core 110, and at least a first outer cladding shown as dual coating buffer 120 on a clad portion of the output fiber core 111 beginning at shoulder 118 comprising a higher index coating 120*b* on a LIP coating 120*a*. The light receiving end 111*a* is stripped/free of the dual coating buffer 120.

The output fiber 115 includes multiple adhesive compositions including an adhesive containing portion securing the output fiber 115 to the substrate 205 including a mode stripper adhesive 225*a* comprising a first adhesive composition thereon and a structural adhesive 225*b* comprising a second adhesive composition thereon compositionally different from the first adhesive composition. It is noted that although not shown in FIG. 2A (as well as not shown in FIGS. 2B and 2C described below), there will generally also be structural adhesive 225*b* on the input fiber 105 positioned somewhere to the left of the region shown.

The leading edge 225$a_1$ of the mode stripper adhesive 225*a* can be seen to be positioned closer to the input fiber core 110 than the structural adhesive 225*b* to first receive the light and strip at least a majority (>50%) of power of cladding guided mode(s) of the light before reaching the structural adhesive 225*b*. Although shown overlapping one another, the mode stripper adhesive 225*a* and the structural adhesive 225*b* can be spaced apart.

The mode stripper adhesive 225*a* and structural adhesive 225*b* have significantly different properties. For example, the mode stripper adhesive 225*a* can have a $n_f$ that is lower or higher than the structural adhesive 225*b* provided the mode stripper adhesive 225*a* is substantially index matched to the material on the fiber that it is in direct physical contact with. The structural adhesive 225*b* is also a more rigid material with the mode stripper adhesive 225*a* being a "non-rigid-soft" material reflected in the lower hardness of the mode stripper adhesive 225*a*. The mode stripper adhesive 225*a* can have a Durometer Shore Hardness on the Durometer Shore A scale and the structural adhesive 225*b* can have a Shore Hardness on the Shore D scale. For example, the mode stripper adhesive 225*a* can comprise a "thermally conducting" silicone defined herein as having a thermal conductivity of at least 1 W/m·K at 25° C., with a temperature handling capability of at least 170° C. up to around 200° C., while the structural adhesive 225*b* can comprise an epoxy, epoxy; polyurethane, acrylate cyanoacrylate, or low temperature glass solder in some embodiments.

The thermal conductivity of the silicone (or other mode stripper adhesive material) can be increased by including of metal particles (e.g., silver particles) to obtain a thermal conductivity of at least 10 W/m·K at 25° C., including >50 W/m·K at 25° C. As known in polymer chemistry, silicones (polymerized siloxanes or polysiloxanes such as polydimethylsiloxane) are polymers which silicon together with carbon, hydrogen, oxygen, and sometimes other elements. These materials comprise an inorganic silicon-oxygen backbone ( . . . —Si—O—Si—O—Si—O— . . . ) with organic side groups attached to the silicon atoms, which are four-coordinate. The mode stripper adhesive 225*a* may also comprise some thermally conductive rubbers.

In one particular embodiment the hardness of the structural adhesive 225*b* measured on the Durometer Shore D scale is 59, while the mode stripper adhesive 225*a* embodied as a silicone mode stripper as measured on the Durometer Shore A scale is 73. A material that measures on the Durometer Shore A scale is recognized as not providing a suitable structural adhesive for securing the fused fiber device 200 to the substrate 205 because of its softness.

The structural adhesive 225*b* can have a minimum glass transition temperature (Tg) of 85° C. and a maximum Tg (or heat degradation temperature) less than that of the mode stripper adhesive 225*a*. Tg is the reversible transition temperature in amorphous materials (or in amorphous regions within semicrystalline materials) from a hard and relatively brittle state into a molten or rubber-like state. The structural adhesive 225*b* can also have well defined properties such as coefficient of thermal expansion (CTE), moisture absorption and bonding strength, and well understood performances under various environmental conditions such as long term dry heat, long term cold storage, temperature cycling etc., but whose continuous maximum operating temperature may be lower than the mode stripper adhesive 225*a*, or the structural adhesive 225*b* can be a low temperature glass solder whose contact with fiber(s) can weaken or damage the fiber(s) at elevated temperatures during device operation.

Heat flow associated with cladding mode light from the dual coating buffer 120 is shown being shunted to the mode stripper adhesive 225*a* which conducts the heat to the substrate 205 (and thus to the housing, not shown) to protect the structural adhesive 225*b* from heat damage during operation of the fused fiber device 200.

The mode stripper adhesive 225*a* is substantially indexed matched to and in direct contact with the outermost layer of the output fiber 115 which is a higher index coating 120*b* shown in FIG. 2A. As noted above, the refractive index matching is within a maximum $n_f$ range of 0.07, and within a maximum range of 0.04 in some embodiments.

Figure 2B:
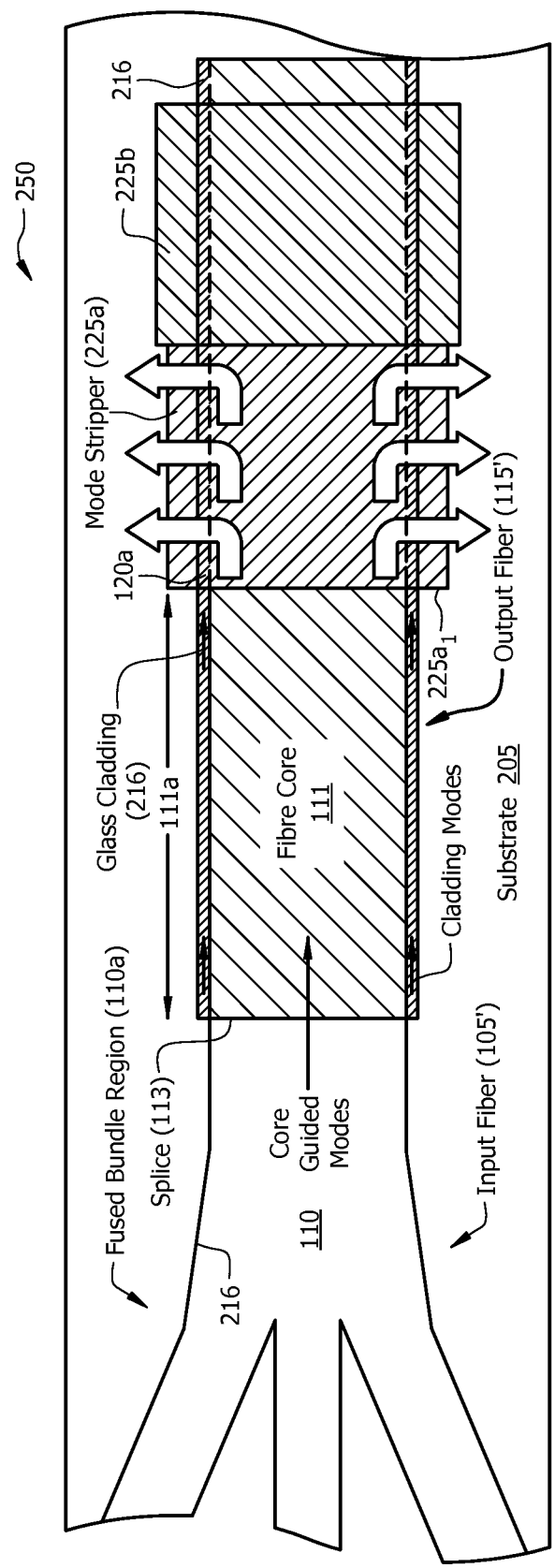
FIG. 2B depicts another example fused fiber device having multiple adhesive compositions including a mode stripper adhesive configured to protect a structural adhesive from heat damage during operation, according to an example embodiment.

FIG. 2B depicts another example fused-fiber device 250 having multiple adhesive compositions including a mode stripper adhesive 225*a* configured to protect a structural adhesive 225*b* from heat damage during operation, according to an example embodiment. Fused fiber device 250 includes a glass clad output fiber 115' including glass cladding 216 thereon which is shown propagating cladding modes launched after the splice 113. In this embodiment the mode stripper adhesive 225*a* and the structural adhesive 225*b* are both on the glass cladding 216 of output fiber 115'. The heat flow associated with cladding mode light from the glass cladding 216 is shown being shunted to the mode stripper adhesive 225*a* which conducts the heat to the substrate 205 (and thus to the housing, not shown) to protect the structural adhesive 225*b* from heat damage during operation of fused fiber device 250.

Figure 2C:
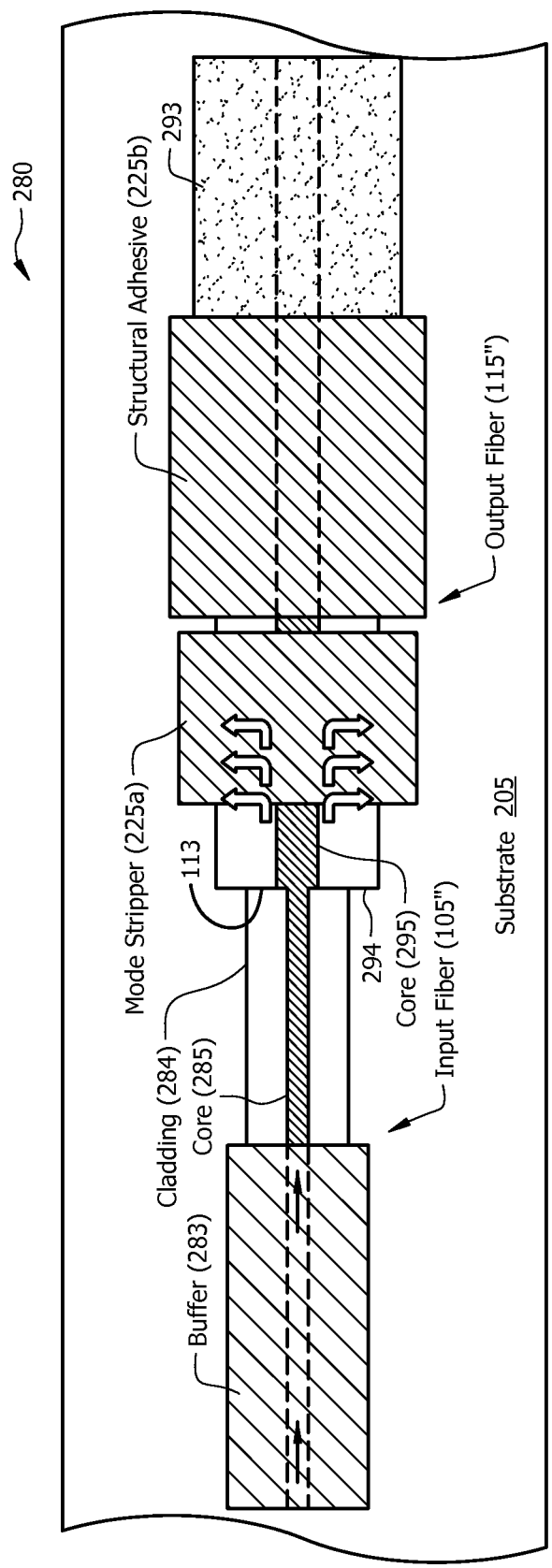
FIG. 2C depicts yet another example fused fiber device including a splice between two dissimilar fibers in a substrate having multiple adhesive compositions including a mode stripper adhesive configured to protect a structural adhesive from heat damage during operation, according to an example embodiment.

FIG. 2C depicts yet another example fused fiber device 280 including a splice 113 between two dissimilar fibers in a substrate 205 having multiple adhesive compositions including a mode stripper adhesive 225*a* configured to protect a structural adhesive 225*b* from heat damage during operation, according to an example embodiment. Fused fiber device 280 includes an input fiber 105" including a buffer layer 283 on a cladding layer 284, on a SM core 285, where the buffer layer 283 is stripped near the splice 113 with the output fiber 115". The output fiber 115" includes a buffer layer 293 on a cladding layer 294, on a SM core 295, where the buffer layer 293 is stripped near the splice 113 with the input fiber 105". SM core 295 is shown larger in size (area) than SM core 285. Although the splice 113 may be high quality to couple single mode light from the SM core 285 of input fiber 105" to the SM core 295 of the dissimilar output fiber 115" with relatively low optical loss, inevitably there will be loss resulting in air guided cladding modes in the cladding layer 294 of the output fiber 115". As described above, the mode stripper adhesive 225*a* strips out these cladding modes from the cladding layer

294 before they reach the structural adhesive 225b to protect the structural adhesive 225b from heat damage during operation.

As noted above, disclosed optical fiber devices include collimator-to-fiber arrangements. FIGS. 3A and 3B described below depict example collimator-to-fiber devices that focus light into cores of SM mode fibers, but can be extended to multimode fibers or DCFs.

FIG. 3A depicts an example collimator-to-fiber device 300 having multiple adhesive compositions including a mode stripper adhesive 225a configured to protect a structural adhesive 225b from heat damage during operation, according to an example embodiment. Light is shown successfully coupled into the output fiber SM core 295 that has an outer cladding layer 294 thereon. The structural adhesive 225b bonds the stripped output fiber core region 215a of the output fiber 215 to the housing 315 for packaging the collimator-to-fiber device 300. In this embodiment the first optical element is a collimating lens 310 for focusing incident light (e.g., laser light) and the mode stripper adhesive 225a and structural adhesive 225b are both directly on the cladding layer 294 of output fiber 215.

As known in the art, coupling incident light into the output fiber's SM core 295 is never 100% successful, so that some light is not coupled into the output fiber SM core 295 that is instead air guided, so that unwanted air guided cladding modes are also shown in FIG. 3A in cladding layer 294. A fiber coating 325 is on the cladding layer 294 beginning at the shoulder 118. The mode stripper adhesive 225a is operative to strip at least a majority (>50%) of power of the cladding guided mode light before reaching the structural adhesive 225b.

In this embodiment the structural adhesive 225b may be a low temperature glass solder in order to provide a hermetic sealing between the housing or the ferrule of a housing 315 and the stripped output fiber 215a. A low temperature melting solder glass is defined herein as a solder glass which becomes fluid at 200 to 400° C. Example solder glasses can comprise a binary or ternary mixture of thallium, arsenic and sulfur, or a zinc-silicoborate glass. A low temperature glass solder can be used as the structural adhesive 225b for collimator-to-fiber device 300. The mode stripper adhesive 225a and stripped output fiber 215a may, for instance, be embedded in a metal channel within the housing 315 to aid heat sinking.

FIG. 3B depicts another example collimator-to-fiber device 350 having multiple adhesive compositions including a mode stripper adhesive 225a configured to protect a structural adhesive 225b from heat damage during operation of the device, according to an example embodiment. Mode stripper adhesive 225a is positioned before (in the direction of light propagation) structural adhesive 225b. For collimator-to-fiber device 350, the structural adhesive 225b which bonds the fiber coating 325 on the cladding layer 294 of the output fiber 215 to the housing 315 can be a conventional polymer adhesive, such as a Shore D plastic composition (e.g., an epoxy). In this case the sealing provided is non-hermetic. Mode stripper adhesive 225a is generally a Shore A adhesive and is used prior to the structural adhesive 225b. Although the mode stripper adhesive 225a is shown entirely on the cladding layer 294, the mode stripper adhesive 225a may also be applied entirely on fiber coating 325 that is on the cladding layer 294, or partially on the cladding layer 294 and partially on the fiber coating 325, or the structural adhesive 225b may be partially on the cladding layer 294 and partially on the fiber coating 325 with the mode stripper adhesive 225a entirely on the cladding layer 294.

Disclosed embodiments are advantageous for optical devices because disclosed mode stripper adhesives couple sufficient cladding mode light and thus heat to enable the structural adhesive in a package to remain at a temperature below its degradation temperature, allowing an existing structural adhesive for an optical device that has a relatively low heat degradation temperature but with well understood properties which is commonly used for "low power" device operation may now also be used under "high power" operation. Understood properties can include Telcordia-type properties which if met may preclude the need for the qualification program required should an adhesive more suitable for "High Power" operation be sought.

For example, Telcordia specification GR-1221 calls out three main adhesives properties, the glass transition temperature (Tg), outgassing, and 85% RH/85C testing. The Tg is the temperature at which an adhesive transforms from hard and glassy to soft and rubbery, where when soft and rubbery the adhesive properties suffer. The Telcordia specification sets a minimum Tg. Outgassing is also a key performance criteria identified by optical device manufacturers. Without industry guidance, the U.S. National Aeronautics and Space Administration (NASA) outgassing specification of 24 hours at 120° C. in a vacuum for total mass loss and collected volatile condensable materials may be used. The final and generally most important performance criterion is the very aggressive damp heat or 85% RH/85C test, the key criteria in obtaining Telcordia certification. The high test temperature will generally cause materials with a Tg below 85° C. to become soft and rubbery, allowing moisture to penetrate the adhesive bond line, resulting in a delamination of the assembly at the adhesive/substrate interface. This test is considered one of the toughest in the industry and is used in the fiber optics market and other communications markets as the benchmark for determining the life of the device.

EXAMPLES

Disclosed embodiments are further illustrated by the following specific Examples, which should not be construed as limiting the scope or content of this Disclosure in any way.

Thermal imaging experiments were performed to demonstrate the impact of the application of a few mms (4 mm to 6 mm) in length of an example moisture curing polydimethysiloxane (PMDS) material having a thermal conductivity of about 1 to 5 W/m·K at 25° C. as a mode stripper adhesive to thermally protect a known commercially available UV curable structural adhesive including epoxy using TFBs in slotted substrates, with both an LIP output fiber, and a glass clad output fiber. In both fiber cases, a thermal image during 915 nm high power (40 W) operation with the guided high power light traversing was obtained. The thermal images obtained revealed high order mode stripping and thus heating predominantly occurring at the PMDS material only, leaving the structural adhesive within 5° C. of the heat sink temperature, which was 20° C. for the LIP case and 24° C. for the glass clad case.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. An optical fiber device, comprising:
   a first optical element for transmitting light received from a light source;

at least one output fiber including an output fiber core having a light receiving end optically aligned to receive said light from said first optical element, and at least a first outer cladding on a clad portion of said output fiber core;

wherein said output fiber includes an adhesive containing portion securing said output fiber to a substrate including a mode stripper adhesive comprising a first adhesive composition thereon and a structural adhesive comprising a second adhesive composition thereon different from said first adhesive composition, wherein a leading edge of said mode stripper adhesive is positioned closer to said first optical element than said structural adhesive to first receive said light and strip at least a majority of power of cladding guided mode(s) of said light before reaching said structural adhesive;

wherein said mode stripper adhesive has a lower hardness as compared to said structural adhesive, and wherein said mode stripper adhesive substantially indexed matched to an outermost layer of said output fiber that it is in direct physical contact with said mode stripper adhesive.

2. The optical fiber device of claim 1, wherein said mode stripper adhesive comprises a first plastic composition having a Durometer Shore Hardness on a Shore A scale and said structural adhesive comprises a second plastic composition having a Durometer Shore Hardness on a Shore D scale.

3. The optical fiber device of claim 2, wherein said first plastic composition comprises a thermally conductive silicone composition having a thermal conductivity of at least 1 W/m·K at 25° C., and said second plastic composition has a minimum glass transition temperature (Tg) of 85° C. and a maximum heat degradation temperature (Tg) less than that of said silicone composition.

4. The optical fiber device of claim 1, wherein said first outer cladding of said output fiber comprises a low index polymer (LIP) cladding, further comprising a buffer layer on said LIP cladding having a refractive index greater than said LIP cladding.

5. The optical fiber device of claim 1, wherein said output fiber comprises a glass clad fiber, wherein said first outer cladding comprises a glass.

6. The optical fiber device of claim 1, wherein said first optical element comprises a focusing lens which focuses said light into said light receiving end of said output fiber core.

7. The optical fiber device of claim 1, wherein said first optical element comprises at least one input fiber including at least one input fiber core and at least a second cladding on said input fiber core, said input fiber providing a light transmitting end free for said transmitting said light received from said light source;

further comprising at least one fused region including a splice joining said input fiber to said output fiber and providing said optically aligned, wherein said first adhesive composition is positioned closer to said splice than said second adhesive composition.

8. The optical fiber device of claim 7, wherein said at least one input fiber comprises a plurality of multimode fibers, said fused region comprises a tapered region, said output fiber is a single fiber consisting of said output fiber core, whereby said optical fiber device comprises a Taper Fused Bundle (TFB).

9. The optical fiber device of claim 1, wherein said structural adhesive comprises a low temperature glass solder.

* * * * *